United States Patent [19]

Neta et al.

[11] Patent Number: 5,200,818
[45] Date of Patent: Apr. 6, 1993

[54] VIDEO IMAGING SYSTEM WITH INTERACTIVE WINDOWING CAPABILITY

[76] Inventors: Inbal Neta; Michal Neta, both of 21 Havazelet Street, Kiron, Israel, 55454; Yves Villaret, Hasigalit 16, Hadera, Israel, 38417

[21] Appl. No.: 673,328
[22] Filed: Mar. 22, 1991
[51] Int. Cl.⁵ .............................. H04N 5/00
[52] U.S. Cl. ..................... 358/87; 358/108; 358/160
[58] Field of Search ............. 358/180, 181, 108, 109, 358/87, 160

[56] References Cited

U.S. PATENT DOCUMENTS

| | | | |
|---|---|---|---|
| 4,797,942 | 1/1989 | Burt | 358/87 X |
| 4,991,020 | 2/1991 | Zwirn | 358/180 X |
| 5,005,083 | 4/1991 | Grage et al. | 358/181 |
| 5,023,725 | 6/1991 | McCutcheon | 358/87 X |
| 5,077,609 | 12/1991 | Manelphe | 358/109 |

Primary Examiner—James J. Groody
Assistant Examiner—Mark R. Powell
Attorney, Agent, or Firm—Allegretti & Witcoff, Ltd.

[57] ABSTRACT

This invention relates to a method and apparatus for a system having a multisensor optical module with a large aperture angle, 180 degrees or more possible (360 degrees-around), and an electronic interface which outputs two video or digital images of the scene. The first image is a high resolution representation of the entire field of view reconstructed from the partial views of each sensor. The second image is a high resolution representation of a selected part of the scene (window), the dimension and position of which can be interactively commanded through a communication port. The size and location of the window may be changed at every frame (typically every 1/30th of a second). The window field of view can cover the field of view of several adjacent sensors while the resulting image will remain continuous and undistorted. An arbitrary number of windows can be obtained with a unique optical sensor by adding electronic modules to the interface apparatus. The system is applicable, for example, in professional video and television, in industrial machine vision, in image processing, in surveillance systems, in teleguided and tele-operated systems and in many other fields.

11 Claims, 4 Drawing Sheets

VIDEO IMAGING SYSTEM WITH INTERACTIVE WINDOWING CAPABILITY

BACKGROUND OF THE INVENTION

The present invention relates to an improved apparatus and method for providing high resolution images of a scene, and for obtaining simultaneously a wide angle image and a "zoomed" image of a particular region of the scene ("window"), with both images having high resolution.

Conventional systems used today for similar purposes generally include a:

1) Video camera mounted on a mechanical orientation system; or a
2) Video camera with an electronic interface system which displays only part of the image seen by the camera.

These prior art systems have the respective disadvantages of:

1) Low speed of orientation and no environmental monitoring, i.e., only the region aimed at is seen. Also, mechanical systems are much less reliable than electronic systems;
2) Low resolution of the image in partial view. In order to obtain high resolution images large C.C.D. arrays can be used, but the price of these arrays increases very rapidly with increased resolution, and the time needed for reading these arrays increases proportionally as the squared value of the image resolution, thus lowering the image rate. Furthermore, wide angle views suffer from focusing and distortion problems since the image spherical surface does not fit the plane sensor surface.

Prior United States patents in related fields which make use of several sensors include:

Combining several video signals into one, giving the possibility of displaying one of them (U.S. Pat. Nos. 4,777,526 and 4,814,869);

Selecting a view from a number of cameras and processing each one in a specific way (U.S. Pat. Nos. 4,779,134, 4,831,438, 4,462,045, 4,577,344, 4,630,110 and 4,943,864);

Making a stereoscopic view by use of two cameras (or volume sensing) (U.S. Pat. Nos. 4,739,400, 4,395,731, 4,559,555 and 4,709,265);

Selecting region of interest from one camera (U.S. Pat. No. 4,713,685);

Moving the area viewed by electronic means in a "vidicon" (U.S. Pat. No. 4,740,839);

Adding some necessary data to video signal (U.S. Pat. No. 4,922,339);

Projecting a 360 degree field of view on one spherical surface and examining it by the use of one rotating sensor (U.S. Pat. No. 3,588,517);

Processing four camera views so that they will give one larger view when displayed on four adjacent monitors (U.S. Pat. No. 4,777,942).

None of these prior art teachings contains the novel and highly advantageous features of the invention described here, which are:

Collecting all pixel data of a determined field of view on a number of sensors, using a specific arrangement of elements;

Treating the pixel data at a video rate (typically 10 Mhz) as part of a global total scene. In U.S. Pat. No. 4,777,942 one global image is built from four different sensors, but this is done by monitor juxtaposition, instead of treating all pixels of all sensors as part of one video image, so that the integration is in fact made by the observer's eyes;

Selecting at a video rate the "region of interest" (window, monitor) pixels from different sensors and arranging them to give a high resolution continuous image;

Changing at every new frame (illustratively every 1/30th of a second) the window parameters (position, length, width); and Defining an unlimited number of windows by adding the necessary number of modular electronic cards in the electronic interface.

OBJECTS OF THE INVENTION

It is a general object of the present invention to provide a new and improved method and apparatus comprising an optical sensor and electronic interface for outputting two video (or digital) images of a wide angle scene. The first video output gives an image of the entire scene, with a possible aperture angle of 180 degrees or more (360 degrees around). The second video output gives an image of a particular region of the scene (window). The position and size of the window are communicated to the system by means of a standard communication port, and may be changed at every new frame, typically thirty times per second.

Some of the principal advantages of this invention are:

1) High resolution image of very wide angle scene.
2) High resolution image of the "window".
3) High rate of change of window parameters (size and position).
4) Use of standard low cost light sensitive arrays, such as C.C.D. arrays.
5) Image rate independent of the image resolution.
6) No moving parts, allowing rugged construction.
7) Possibility of opening additional windows by adding electronic modules.

BRIEF SUMMARY OF THE INVENTION

The preferred embodiment of the present invention comprises two primary parts:

1) The optical module
2) The electronic interface

The optical module is comprised of a number N of light sensitive arrays (illustratively, C.C.D. arrays), disposed on an hemisphere-like surface, with each array having its own lens system. Every sensor element covers part of the total field of view so that the entire field of view is covered by all of the sensors elements, with some necessary overlapping. Every sensor element is connected to the electronic interface.

The electronic interface receives data from all of the sensor elements and makes an integration of such data. Data from all sensors is collected and digitized in parallel by synchronous scanning. Then, the integration is made by selecting, at every stage of scanning, the particular data that is relevant for the current pixel of the considered video (digital) image. As a result, there is no need to store the total amount of information contained in sensor elements, and a low cost implementation is possible.

In accordance with the improved method and apparatus, two video (digital) images are produced, namely:

1) "Monitor Image": This image gives a continuous representation of the entire field of view. Several representation models are possible, since the basic shape of field of view is spherical while the "Monitor Image" is a plane representation. For example, if the field of view has a 180 degree aperture angle, a polar representation can be chosen.

2) "Window Image": This image gives a continuous representation of a selected portion of the field of view. This portion can cover a number of sensors but the transition from one sensor to an adjacent one is not perceptible on the "Window Image". The size and position of that "Window" (window parameters) is transmitted to the system via a dedicated standard communication port, from a host device like a joystick or a host computer. A new set of window parameters can be down loaded at every new image frame, typically thirty times per second.

By adding a desired number of electronic modules in parallel, several window images can be produced using an unique optical module.

DETAILED DESCRIPTION OF A PREFERRED EMBODIMENT OF THE INVENTION

Figure 1:
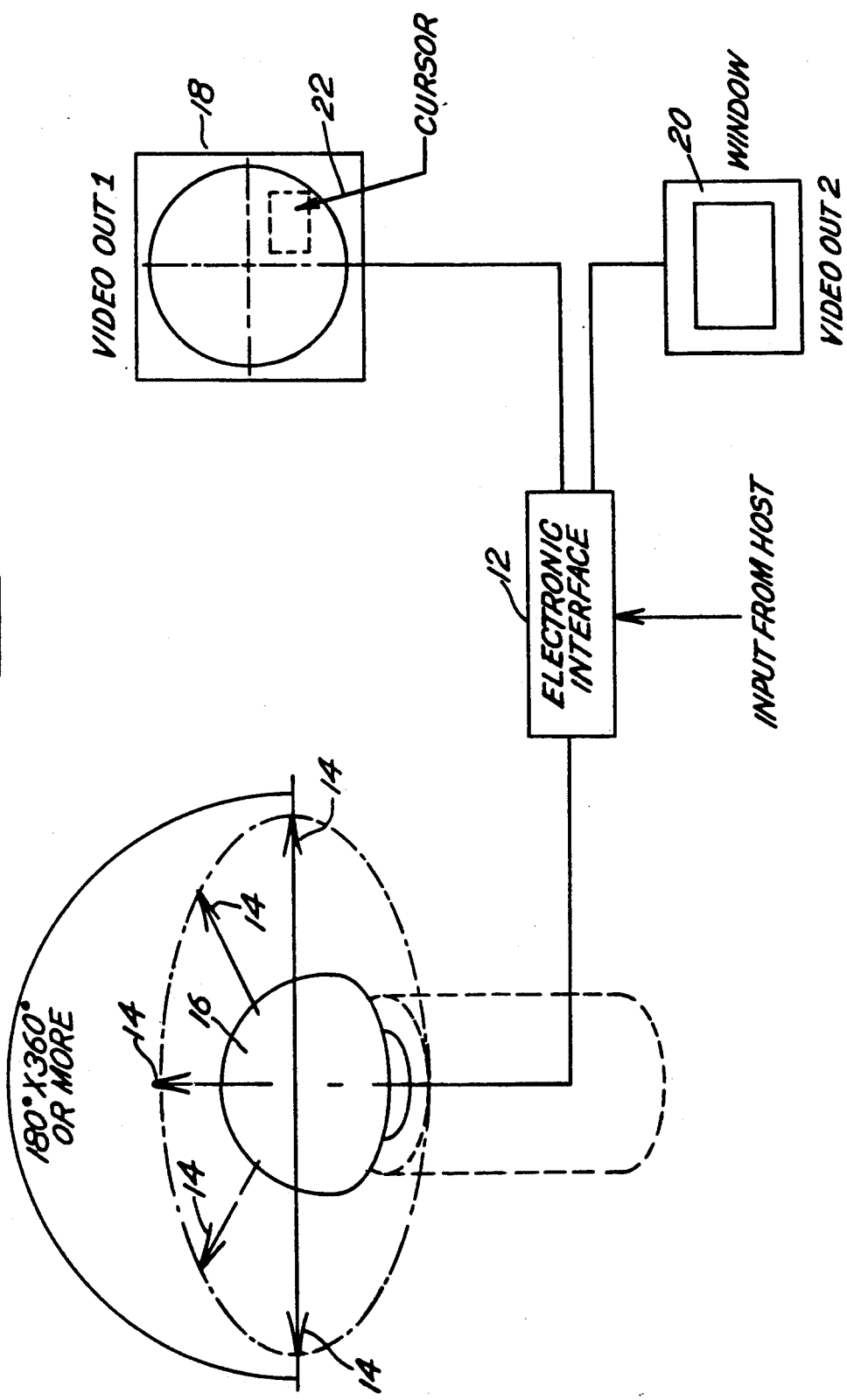
FIG. 1 is a schematic description of the system components and connections, in accordance with a preferred embodiment of the invention.

As shown in FIG. 1, the preferred embodiment of the inventive system is divided in two parts, namely, the optical module 10 and the electronic interface 12.

The optical module 10 is comprised of a number N of light sensitive arrays 14 disposed on an hemisphere like support surface 16.

The output from the sensor elements of the optical module 10 is provided to the electronic interface 12. The latter is connected to two video displays 18 and 20, which provide at video out 1 a high resolution representation of the entire field of view reconstructed from the partial views of every sensor, and at video out 2, a window image which is a continuous representation of a selected portion of the field of view on video output display 18, as chosen by the cursor 22.

Figure 2:
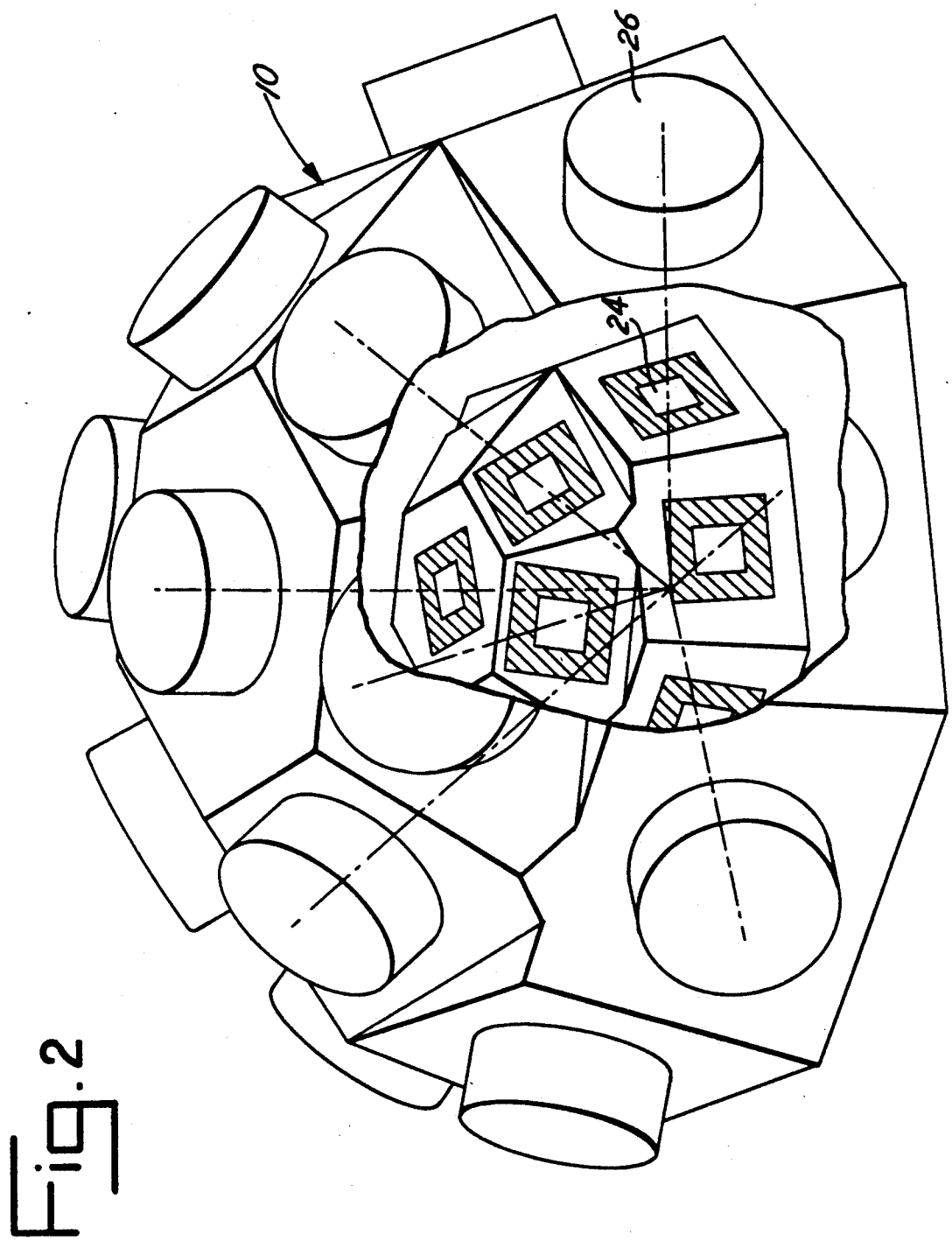
FIG. 2 is an illustrative arrangement of the invention having 15 sensors and lenses, giving a 180 degrees aperture angle field of view.
Figure 3:
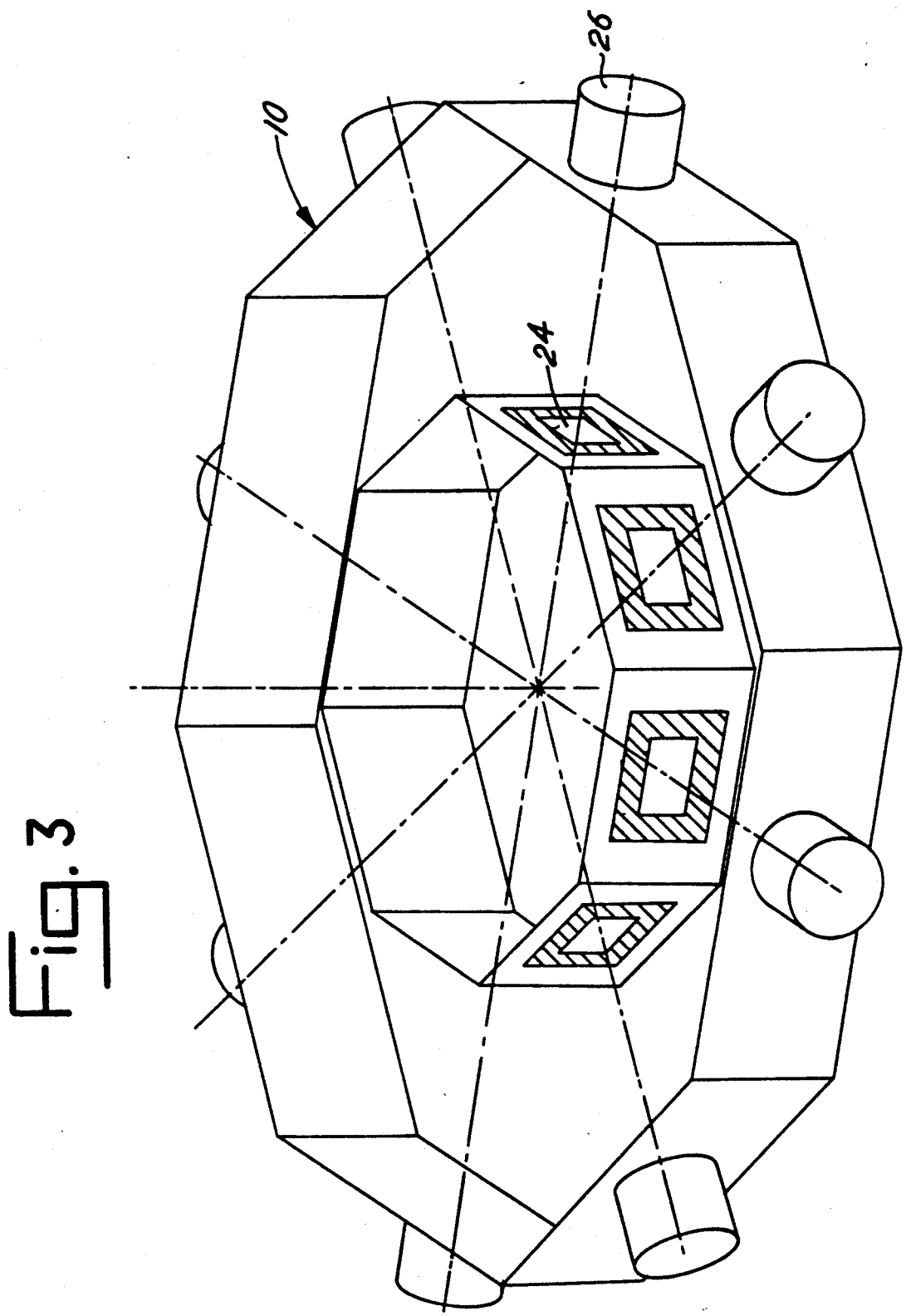
FIG. 3 is another illustrative arrangement of the invention having 8 sensors and lenses, giving a ±20° and 360° around field of view, applicable, for example, in vehicle teleguiding.

Two preferred embodiments are shown in FIGS. 2 and 3, but those skilled in the art will understand that the disposition of sensor elements and lenses can be fitted to the particular application. Each sensor element is connected by a suitable cable to the electronic interface 12. The focal length of the lenses is determined so that every point of the field of view will have at least one image point on one sensor.

FIG. 2 illustrates an arrangement having fifteen sensors for a hemispheric field of view. Each lens system disposed on the hemispheric-like surface of the optical modular 10 comprises a light sensitive array formed of a sensor element 24 and a lens 26.

FIG. 3 illustrates an alternative arrangement having eight sensors for ±20° and 360° around field of view. As in the case of the FIG. 2 arrangement, each lens system disposed around the periphery of the optical module 10 comprises a light sensitive array formed of a sensor element 24 and a lens 26.

Every sensor element 24, whether on the optical module 10 in the FIG. 2 arrangement or in the FIG. 3 arrangement, is connected to the electronic interface 12 so the latter receives all data from all the sensor elements to make an integration, as further described below with respect to the illustrative arrangement of FIG. 4.

Figure 4:
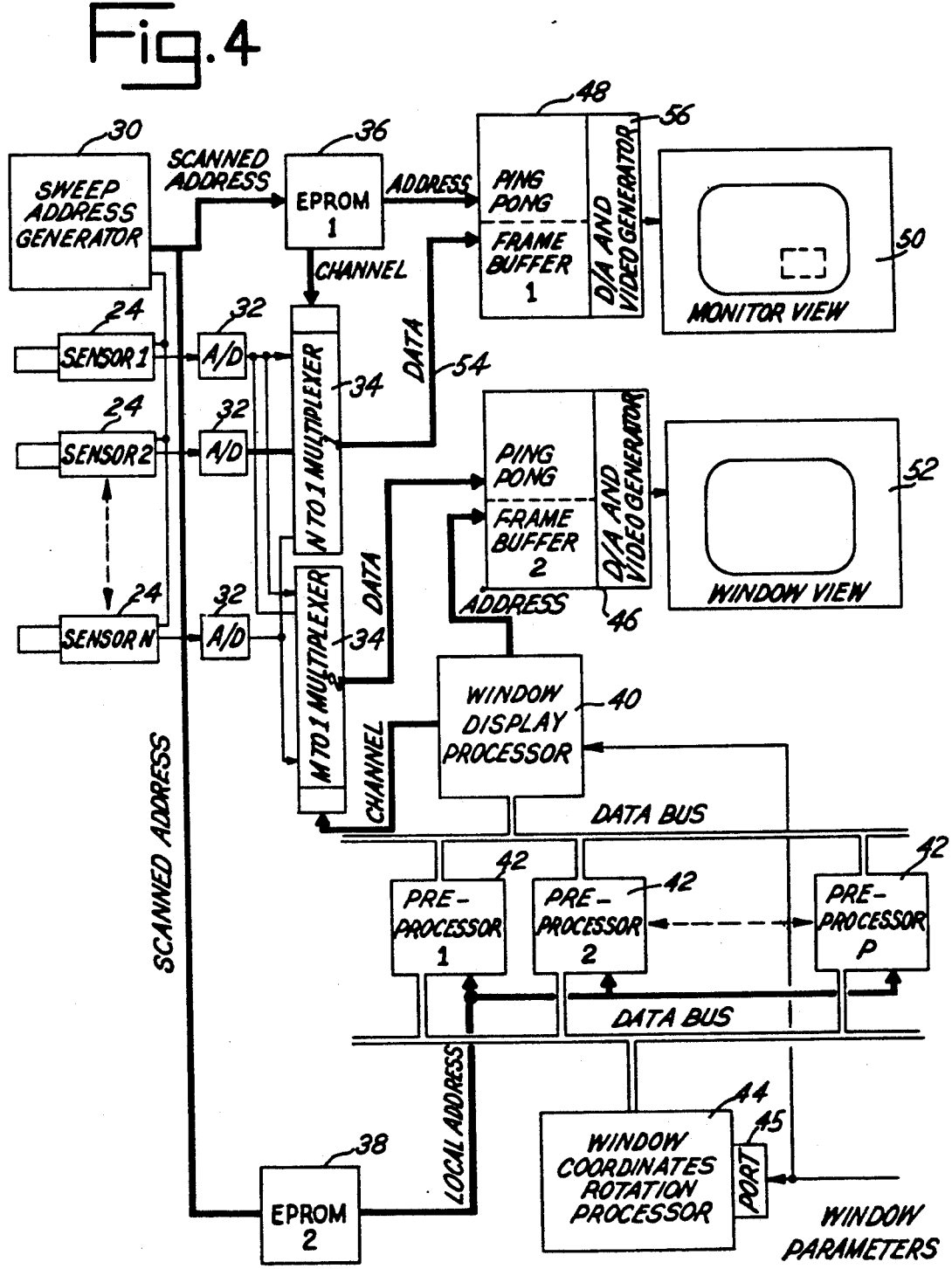
FIG. 4 is a general block diagram of an illustrative electronic interface.

An illustrative electronic interface schematic block diagram is shown in FIG. 4. A detailed description of all modules of this electronic interface embodiment follows:

Sweep address generator 30

This circuit generates, at a video rate, a signal for sampling all sensors. This signal is also used to create a scanning address that will be used as entry for tables in the EPROM memories. The sweep address generator 30 can be of any of the various types known in this art for providing this function.

A/D converter 32 and multiplexers 34

An analog to digital converter 32 (A/D) is connected to receive the output of each sensor 24. Data from each sensor is digitized by N analog to digital converters 32 (one per sensor), and is entered into two N to 1 multiplexers 34. This conversion is made at standard video speed ("Flash/A/D"). The A/D converters and multiplexers 34 also can be of any type known in this art for providing these functions.

EPROM 1 and EPROM 2

The illustrative embodiment of the preferred inventive system arrangement utilizes 2 EPROMS:

The first EPROM 36 contains a sampling set of sensor selection numbers and coordinates, which are predetermined for giving a good "monitor" image. At every scanned address, the EPROM outputs a "select sensor" number which indicates from which sensor element the data is to be taken now, and a "Monitor Frame Buffer" address which indicates at which place in the monitor image the data will be stored. The EPROM table is built so that if there are N sensor elements, 1 every N pixel of a given sensor will be taken, and the monitor image will be of the same resolution as that of a single element.

The second EPROM 38 contains a table of the coordinates of a pixel in a plane coordinate system with unity vectors along a first line and first row of the sensor (further called "local coordinates"). The constants addressed by the sweep address generator will then be transmitted to the pre-processors modules. Advantageously, in this EPROM, all sensors elements and lenses are identical (in the case of the preferred embodiment) otherwise one EPROM per sensor will be needed. The EPROM constants will also contain the corrections needed to compensate the distortion of the optical system.

Window Coordinate Rotation Processor

This module 44 gets its input window parameters through a standard communication port 45. It determines the candidate sensor elements for this window and assigns to every candidate sensor element one pre-processor 42. Then, it calculates the local coordinates of the two vectors formed by the first line and first row of the window in the local coordinate system of each candidate sensor element, and sends them to all assigned pre-processors. This is done once per window (once per frame). This procedure allows all pre-processors 42 to receive data from one EPROM module, provided all sensor elements and lenses are identical. If several windows are intended for use with one optical sensor, additional window coordinate rotation processors 44 may be needed.

Pre-processors 42

There are P pre-processors 42, where P is defined as the maximum number of sensor elements having pixels in one window. This number is determined by the disposition of sensor elements and by the maximum size allowed to "window". In the preferred embodiments described here, if the maximum aperture angle of the window is twice the aperture angle of one sensor element, then p=6 for the sensor arrangement of FIG. 2 and p=3 for that of FIG. 3. The role of each pre-processor 42 is to examine the coordinates of pixels received from the EPROM 38, and to decide whether this pixel belongs to the window by comparing these coordinates with the local parameters of window as received from the window coordinate rotation processor 44. The first pre-processor 42 that detects an "In Window" pixel will send the sensor element number and local coordinates of window (i.e., local coordinates of vectors formed by the first line and first row of window) to the window processor 40 and inhibit data from other pre-processors. This must be done at video speed but the functions performed are merely comparisons and data transfer.

If several windows are required, then there must be P pre-processors dedicated to each window.

Window Display Process 40

This module gets as its input the identity of the sensor element, the local coordinates of the "in-window" pixel, and the local coordinates of the two vectors formed by the first line and row of the window. Then it performs the calculation of the coordinates of pixel into window and sends it to the window ping-pong frame buffer 46. It also outputs the sensor number of the "in window" pixel to the second N to 1 multiplexer 34; this calculation must also be done at video speed. It consists of vector scalar multiplication and scaling.

"Monitor" and "Window" Frame Buffers

These two modules buffer the data of monitor and window image in a ping-pong mode. Each frame buffer is divided in two similar sections. While one section is used to display the previous image, the other section collects data for the next image; this mode of operation is necessary in the illustrative embodiment shown, since data is not entered in the same order as the sweeping address.

Set forth below is a step-by-step description of the signal propagation and operation of the preferred embodiment.

Sensor sampling and EPROM addressing

The sweep address generator 30 produces two different signals. The first signal is a sweep signal for the N sensors 24 with the required format to provide a normal line by line synchronous scanning of all sensors.

The second signal is sent from the sweep address generator 30 to the EPROM modules 36 and 38. It is a two word parallel signal comprised of line and row values of the presently sampled pixel of the sensors 24.

The resulting analog output of each sensor 24 is converted to digital data and is directed to the N to 1 multiplexer 34, one for the monitor view display 50 and one for the window view display 52.

Signal Propagation for the Monitor View 50

EPROM 36, addressed by the sweep address generator 30, outputs data which is divided into two words. The first word contains the identification number of the sensor which has been preselected at the present sweep address, and is sent to the multiplexer command register 34.

The second word contains the line and row address of the sampled pixel in a monitor view 50. Line and row address data are then sent to the ping-pong frame buffer 48, while corresponding data is received from the multiplexer 34 output over the data line 54.

When an entire frame has been sampled from the sensors, the presently filled half of ping-pong frame buffer 48 is left for display, and the next frame data is stored in the other half. The video generator part 56 of the ping-pong frame buffer 48 scans the previously written half and produces the video output, providing the monitor image on monitor view display 50.

Signal Propagation for the Window View 52

EPROM 38, addressed by the sweep address generator 30, outputs an address comprised of two words which are the coordinates of the sampled pixel in all sensors, in the local coordinate system having an axis along the first line and first row of sensor. This "Local Address" is sent to all pre-processors 42.

Meanwhile, the window coordinates rotation processor 44 calculates local coordinates and parameters of window for each candidate sensor (i.e. the local coordinates of vectors formed by first line and first row of window), and sends them to the pre-processors 42 where they are stored for use at next frame.

The pre-processors 42 compare data from EPROM 38 with the data of window received during the previous frame. If a comparison results in an "in window" decision, it sends all inputs from EPROM 36 and window coordinate rotation processor 44 to the window processor 40 with the addition of the sensor number. Since there is some overlapping between sensors, it may occur that several pre-processors respond together. In such event, an arbitration system can be provided to install a priority order between pre-processors.

Window processor 40 now makes two scalars multiplications of: (1) local coordinates of pixel with local coordinates of the first line of window; (2) local coordinates of pixel with local coordinates of the first row of window. These two scalars give the line and row number in window. Simultaneously, the sensor number is sent to multiplexer 34 from window display processor 40.

The window ping-pong frame buffer 46 thus gets line and row address from the window display processor 40 and data from multiplexer 34, and functions similarly to the monitor frame buffer 48, outputting a video signal to the window view display 52.

As will be evident in the art, numerous variations may be made in the practice of the invention without departing from its spirit and scope. Therefore, the invention should be understood to include all the possible embodiments and modifications of the illustrated embodiments without departing from the principles of the invention as set out in the appended claims.

What is claimed is:

1. In a system for providing high resolution images of a scene, apparatus for simultaneously obtaining a wide angle image of the scene and a window image of a selected particular region of the scene, comprising:

an optical module having a plurality of light sensitive arrays disposed therearound, each light sensitive array comprising a sensor element and a lens element for providing electrical output signals representative of the scene;

means for connecting the output of each light sensitive array to an electronic interface, said electronic interface comprising means for processing the signals from said light sensitive arrays;

monitor view display means;

window view display means; and means for connecting the output signal from said electronic interface to said monitor view display and said window view display to provide on the monitor view display a high resolution image of the entire scene obtained by the combination of a plurality of images acquired simultaneously on a plurality of sensor elements and on the window view display a high resolution image of a selected particular region of the scene obtained by the integration of data received from the sensor elements.

2. In a system for providing high resolution images of a scene as set forth in claim 1 wherein said optical module comprises a hemispheric-like surface having light sensitive arrays disposed around said surface.

3. In a system for providing high resolution images of a scene as set forth in claim 1 wherein said optical module comprises a polygonal shaped number having light sensitive arrays disposed around the periphery of said member.

4. In a system for providing high resolution images of a scene as set forth in claim 1 wherein said electronic interface comprises means to sample all sensor elements in the optical module, means to collect all pixel data of a determined field of view on said sensor elements, and means to provide to the monitor view display signals corresponding to an image of the entire scene, and to provide to the window view display signals corresponding to an image of a selected particular region of the entire scene such that both images can be viewed simultaneously.

5. In a system for providing for high resolution images of a scene as set forth in claim 4 wherein said electronic interface further comprises means to change the size and position of the window image on the window view display means.

6. In a system for providing high resolution images of a scene, a method for simultaneously obtaining a wide angle image of the scene and a window image of a selected particular region of the scene, comprising the steps of:

obtaining from an optical module having a plurality of light sensitive arrays disposed therearound, electrical output signals representative of the scene;

connecting the signals from each light sensitive array to an electronic interface;

processing the signals at the interface to provide two sets of output signals respectively representing the entire scene and a selected window region of the entire scene; and connecting the output signals from said electronic interface to a monitor view display and a window view display to provide on the monitor view display a high resolution image of the entire scene obtained by the combination of a plurality of images acquired simultaneously on a plurality of light sensitive arrays and on the window view display a high resolution image of a selected particular region of the scene obtained by the integration of data received from the light sensitive arrays.

7. In a system for providing high resolution images of a scene as set forth in claim 6 further comprising the steps of sampling sensor elements in the optical module, collecting all pixel data of a determined field of view on said sensor elements, providing to the monitor view display signals corresponding to an image of the entire scene, and providing to the window view display signals corresponding to an image of a selected particular region of the entire scene such that both images can be viewed simultaneously.

8. In a system for providing for high resolution images of a scene as set forth in claim 7 further comprising the step of changing the size and position of the window image on the window view display means.

9. In a system for providing high resolution images of a scene scanned by a plurality of sensors, apparatus for simultaneously providing a monitor image of the scene and a window image of a selected particular region of the scene comprising:

means for receiving input signals from an arbitrary number N of sensors, each sensor scanning a portion of an image of a scene, said N sensors covering the entire scene with possible overlapping, means for receiving a set of numerical input signals through an electronic interface, said numerical input signals representing the position, form and size of an arbitrary number of arbitrary window portions of the image of the scene, and means for providing output signals, after each set of N input signals has been received from the N sensors, representing the following data:

(a) a monitor address number representing the position of one pixel in a monitor image frame intended to represent the entire scene, (b) window address numbers, equal to or greater than the number of windows, each window address number representing the position of one pixel in a window image frame intended to represent one portion of the scene defined by one set of said numerical input signals, (c) a monitor selection number defining the sensor from which data will be taken, representing the light intensity of the point in the image of the entire scene at the position given by said monitor address number, and (d) window selection numbers, equal to or greater than the number of windows, defining the sensor from which data will be taken, representing the light intensities of the points in each window portion of the image of the scene at the position given by said address number.

10. In a system in accordance with claim 9 further comprising frame buffer means for collecting said output signals from the system and for displaying at an external display device the received data and forming an electronic image of the monitor view and the window view.

11. In a system in accordance with claim 10 further comprising means for connecting the N sensors, means for connecting to an external electronic device capable of providing numerical output signals defining the size, form and position of a portion of the window image of the scene, means for switching and connecting the sensors selected by said monitor and window selection number output signals to said frame buffer means and means for connecting external display devices capable of providing monitor and window images of the entire scene and of the selected portions of the scene.

* * * * *